Aug. 19, 1958    J. H. BOLTON    2,848,576
ELECTRO-PNEUMATIC DIFFERENTIAL PRESSURE SWITCH SYSTEM
Filed April 2, 1956    3 Sheets-Sheet 1
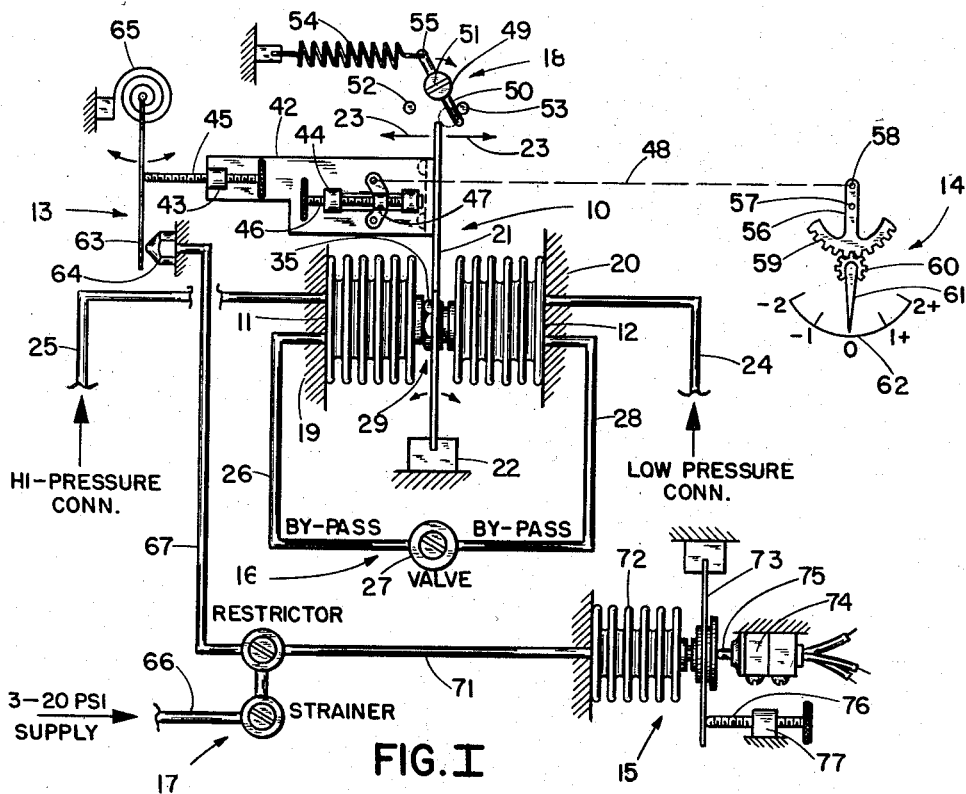
FIG. I
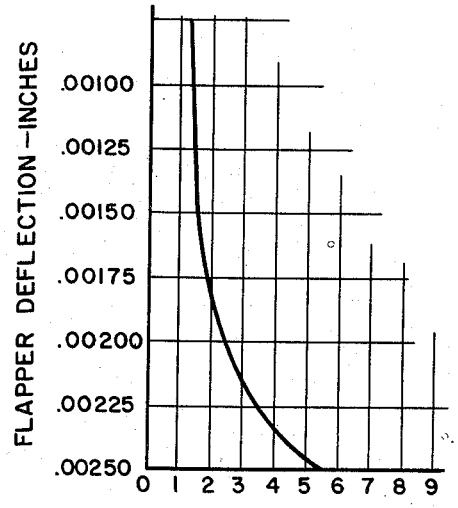
FIG. II
NOZZLE PRESSURE-PSI
.022" DIA. NOZZLE.
500 CC/MIN. BLEEDER TUBE
FLOW RATE.
INVENTOR
JOHN H. BOLTON
BY
Lawrence H. Poston
AGENT

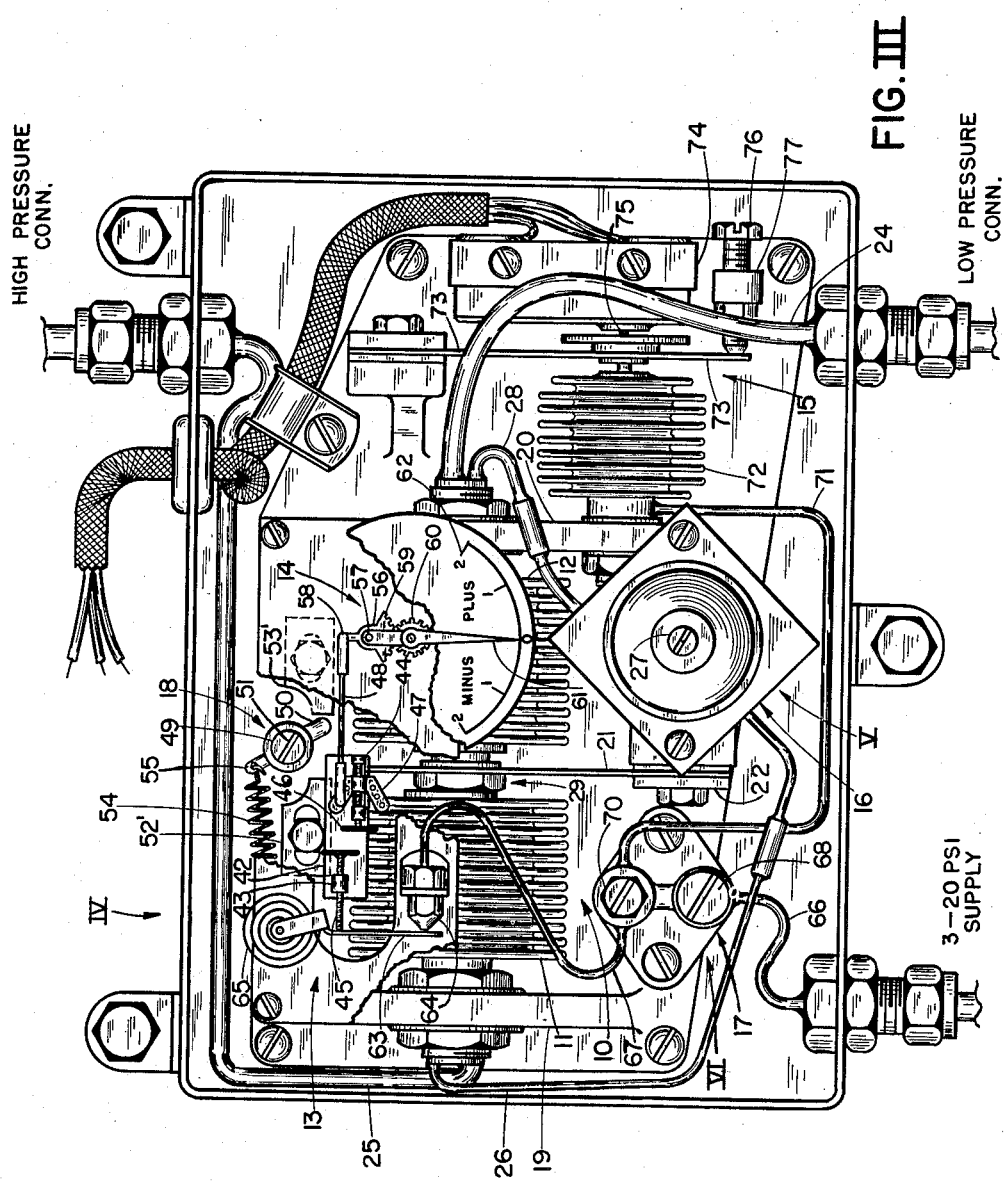

Aug. 19, 1958  J. H. BOLTON  2,848,576
ELECTRO-PNEUMATIC DIFFERENTIAL PRESSURE SWITCH SYSTEM
Filed April 2, 1956  3 Sheets-Sheet 3
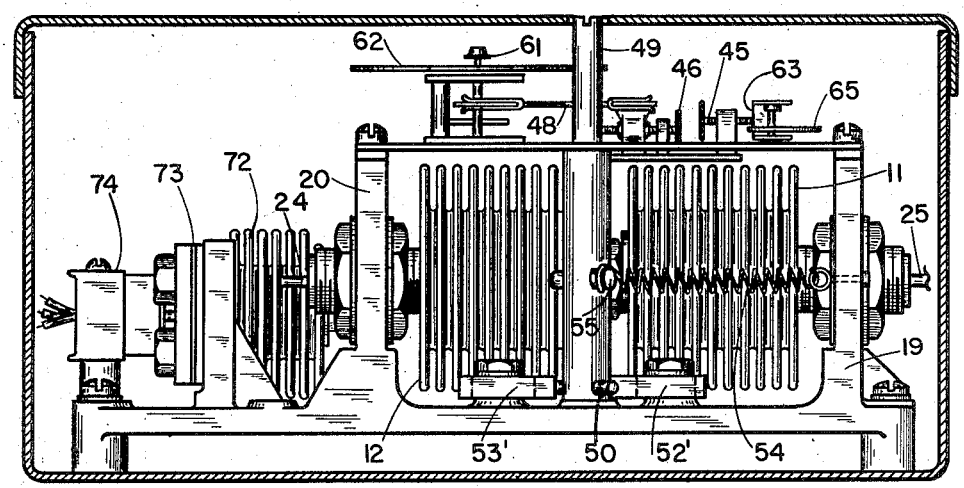
FIG. IV
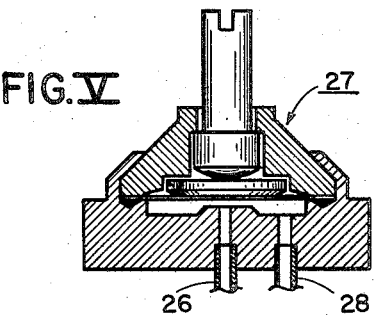
FIG. V
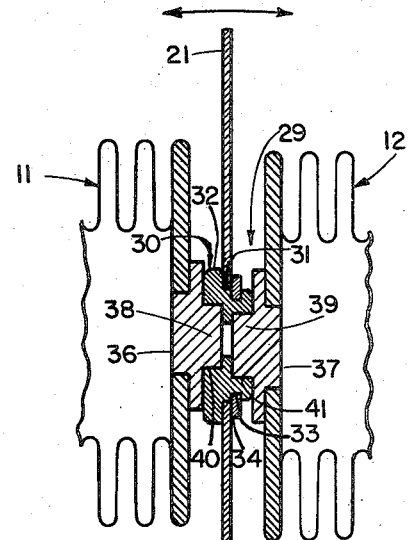
FIG. VII
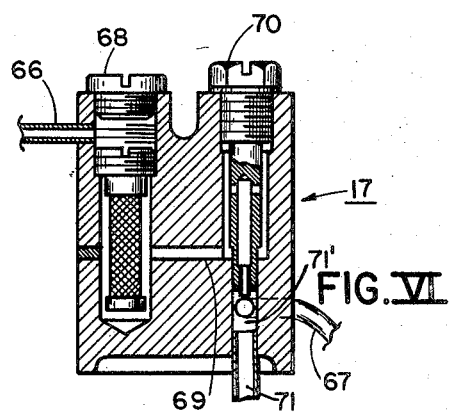
FIG. VI
INVENTOR
JOHN H. BOLTON
BY
Lawrence H. Bolton
AGENT under their pre-load forces. During this operation, the pneumatic output of the bellows arrangement 10 is indicated in the indicator 14.

United States Patent Office 2,848,576
Patented Aug. 19, 1958

2,848,576

ELECTRO-PNEUMATIC DIFFERENTIAL PRESSURE SWITCH SYSTEM

John H. Bolton, Pointe Claire, Quebec, Canada, assignor to The Foxboro Company, Foxboro, Mass., a corporation of Massachusetts Application April 2, 1956, Serial No. 575,453

1 Claim. (Cl. 200—81.5)

This invention relates to systems for automatically operating electrical switches, and has particular reference to a differential pressure pneumatic system with special arrangements for high sensitivity operation of an electrical switch.

In the modern usages of industry it is vital in many instances to maintain close control of operating variables, often within small ranges and in precise relations. Such control often involves the use of electrical switches, and it is often desirable to use readily available pneumatic pressures for the operation of such switches. By prior art standards present day electrical switches which are capable of reliably handling substantial loads are quite sensitive and the movement required for their operation is quite small. However, in relation to very small differential pressure forces of actuation available under present day needs, the forces and movements required for the operation of such switches are relatively very large. This invention provides means for the operation of such switches by initially very small differential pressure forces over a substantial range of differentially opposed pressures. As an illustrative example, this invention provides means for differentially relating pneumatic pressures of the order of up to 80 p. s. i. to provide very small differential pressure forces, and means for operating such standard electrical switches from such small forces through pneumatic and linkage amplification.

It is therefore an object of this invention to provide a new and improved electro-pneumatic differential pressure switch system.

It is a further object of this invention to provide means for operating a standard electrical switch from a small force produced by the opposition of two large pressures, through pneumatic and linkage amplification.

Other objects and advantages of this invention will be in part apparent and in part pointed out hereinafter.

In the drawings:

Figure I is a schematic showing of an illustrative embodiment of this invention;

Figure II is a sensitivity curve of pneumatic nozzle-baffle relations as associated with the system of Figure I;

Figure III is a plan view of an assembly from Figure I;

Figure IV is an elevation, in part, of the assembly of Figure III, taken in the direction indicated by IV in Figure III;

Figure V is a showing of the by-pass valve indicated by V in Figure III and taken generally in vertical central section;

Figure VI is a showing of the filter and bleed unit indicated by VI in Figure III and taken generally in vertical central section; and Figure VII is a sectional showing of the opposition arrangement of the differential pressure bellows of Figure III.

The device of this invention may be used as a safety device to activate an alarm indicating a pressure relation which permits the escape of dangerous gases. It uses metal bellows of reasonable size for a reasonable volume of gas at low power. Thus a small quantity of gas can be used to provide a small differential between relatively large pressures. The device thus achieves reliability with good speed of response through the use of practical sizes of connection tubing and with small volumes of gas and small operational movement. This device, further, enables the use of practical, commercial snap-switches capable of handling considerable currents without burning of contacts, without chatter, and essentially without being affected by vibration. It provides a small unbalance force at random over a substantial range of opposed pressures, since the opposing bellows are balanced against each other and the stiffness relation of the bellows over the spread of the scale stays effectively constant. This device, further, is not disturbed by vibration since its pneumatic system is dampened by capacity effects and is supplied through a pneumatic restriction.

The sensitivity considerations of this invention are an important part thereof and will be discussed hereinafter in connection with the description relating to Figure II.

In Figure I, the system shown is an illustrative embodiment of this invention and includes a pneumatic differential pressure arrangement 10 of a pair of bellows 11 and 12. The differential pressure force provided through this arrangement operates a pneumatic amplifier unit 13 and an indicator unit 14. The output of the amplifier unit is applied to a unit 15 in the form of a pneumatic bellows operated electrical switch arrangement. This system is also provided with a pre-operation bellows balancing by-pass arrangement 16, a pneumatic filter and restrictor unit 17, and a calibration and test arrangement 18.

The constructions indicated in Figure 1 are illustrated in the specific structural showings of Figures III–VII inclusive, and like reference numbers indicate like parts, throughout these figures. Thus in the consideration of the description of Figure I, reference to the other structural figures, III–VII, may be found useful.

As in Figure I, the opposing bellows 11 and 12 have their outer ends fixed as at 19 and 20, and their inner opposing ends movable and applied to opposite sides of a flexure arm 21. The mounting of the flexure arm 21 is at one end thereof, to a fixed block 22 with a normal pivot point adjacent to the block 22. Thus the flexure arm is movable, laterally as viewed in Figure I and as indicated by arrows 23, according to the pressure differential between the bellows 11 and 12. Bellows 12 is indicated as a "low" pressure bellows, with a "low" pressure supply pipe 24 extending thereinto. Bellows 11 is indicated as a "high" pressure bellows, and has a "high" pressure supply pipe 25 extending into it.

It should be noted that the contemplation of this invention includes situations wherein the "high" pressure is only a fraction of an ounce per square inch more than the "low" pressure. It is desirable therefore for a very small pressure differential to result in the application of an operatively appreciable force to the flexure arm. To this end, the bellows 11 and 12 are first selected to be as nearly alike as is reasonably practical under reasonable production conditions. The bellows (11, 12) are then mounted as shown in the drawings, and the by-pass arrangement 16 is applied thereto. That is, the bellows 11 and 12 are pneumatically connected through pipe 26, valve 27, and pipe 28. Then a test pressure is applied to the bellows 11 and 12 through their supply pipes 25 and 24. To insure that this pressure is identical in both bellows, the by-pass valve 27 is opened. Under a particular situation, with the contemplation of this invention, this test pressure may be of the order of 80 p. s. i. A particular "zero differential" position of the flexure arm 21 results when the above test pressure is applied to the bellows (11, 12) and when these bellows are exactly balanced in opposition. Under practical conditions this is a difficult matter to achieve unless a final, delicate adjustment is provided. In the device of this invention such an adjustment is provided at the flexure 21, between the bellows, as indicated at 29, and as shown enlarged and sectioned in Figure VII.

This bellows balancing adjustment involves small movements of the high pressure bellows 11 along the flexure arm 21, toward and away from the flexure arm support block 22. That is, the point of application of the force of the bellows 11 to the flexure arm 21 is adjusted to change the leverage moment of the combination of the bellows 11 and the flexure arm 21. Thus the final adjustment in the bellows (11, 12) balancing procedure is to change the mechanical leverage of the high pressure bellows arrangement with respect to that of the low pressure bellows arrangement.

This bellows adjustment is illustrated in Figure VII wherein a rotatable plug 30 is mounted in a transverse opening 31 in the flexure arm 21. The plug 30 is shouldered at 32 to abut on the high pressure side of the flexure arm 21, and is peripherally slotted at 33 to receive a C washer 34 to abut on the low pressure side of the flexure arm 21. The plug shoulder 32 is provided with peripheral "flats" 35 (Figure I) to form a wrench receiving periphery by means of which the plug 30 may be rotated in the flexure arm opening 31. The bellows 11 and 12 are provided with centrally located end plugs 36 and 37, having axially outstanding bosses 38 and 39 respectively. The flexure arm plug 30 is provided with generally opposed recesses 40 and 41 for receiving the bellows bosses 38 and 39. However, the high pressure side recess 40 is off-center with respect to the axis of rotation of the plug 30, while the recess 41 is concentric with the axis of rotation of the plug 30. Thus rotation of the plug 30 produces small movements of adjustment of the high pressure bellows force application point along the flexure arm 21 whereas the low pressure bellows force application point is not changed. Accordingly, this arrangement provides a final exact balancing adjustment between the bellows 11 and 12.

This balance having been achieved, the by-pass valve 27 (Figure I) is closed, and the bellows 11 and 12 thereafter respond to very small pressure differential therebetween to apply a force to the flexure arm 21 which is representative of the pressure differential.

The flexure arm 21 extends from the support block 22, between the bellows 11 and 12, and outward therefrom a substantial distance as a device for providing mechanical amplification of the force produced by a pressure differential between the bellows 11 and 12. Adjacent the outer end of the flexure arm 21, a laterally extending support plate 42 is mounted on the flexure arm 21. A pair of adjustment brackets 43 and 44 are mounted on the plate 42, with an adjustment screw 45 threaded in the bracket 43 and an adjustment screw 46 threaded in the bracket 44. Both of these screws are movable in directions transversely of the flexure arm, with the screw 45 operatively associating the flexure arm 21 with the pneumatic amplifier unit 13 and the screw 46 through a connection plate 47 and a mechanical connection 48, operatively associating the flexure arm 21 with the indicator unit 14. Thus the screws 45 and 46 respectively provide individual adjustments between the flexure arm 21 and the pneumatic amplifier unit 13, and between the flexure arm 21 and the indicator unit 14. Accordingly, the pneumatic amplifier unit 13, the indicator unit 14, and the flexure arm 21 may be relatively related for zeroing and calibration purposes.

As a means of testing and calibrating this device, the manual adjustment arrangement 18 is located adjacent the outer end of the flexure arm 21. This arrangement 18 includes a rotatable shaft 49 with its axis of rotation parallel to the pivot axis of the flexure 21. A pin 50 is mounted transversely of the shaft 49 and engages the side of the flexure arm 21 as the shaft 49 is rotated. The shaft 49 is rotatable by means of a screw slot 51 and is preferably so arranged as to be rotated clockwise and to apply a force to the flexure arm 21 against the high pressure force applied thereto through the bellows 11. A pair of stops 52 and 53 are provided for engagement by the pin 50 to limit the rotational movement of the shaft 49, with the pin 50 normally held against the stop 53, out of the way of the normal operative movement of the flexure arm 21, by means of a spring 54 attached to a second transverse pin 55 on the shaft 49. In Figures III and IV like stops 52' and 53' are shown as adjustable. As will be apparent from the description hereinafter, the usual operation of the calibration and test arrangement 18 is to move the flexure arm 21 down scale from positive differential position toward the zero position.

The indicator unit 14 comprises a lever 56 with a central pivot 57, a connection point 58 on one side of the pivot 57 for receiving the connection 48 from the flexure arm 21, and a gear sector 59 on the other side of the pivot 57. A pinion 60 is rotated by the gear sector 59 and in turn moves an indicator arm 61 over a suitable scale 62.

On the other hand, the pneumatic amplifier unit 13 comprises a pivoted baffle plate 63 which is biased toward a pneumatic nozzle 64 by a coil spring 65 about the baffle pivot. A pneumatic flow out of the nozzle 64 is established in a conventional manner from a pneumatic supply pipe 66 through the filter and resistrictor unit 17 and a nozzle pipe 67. Figure VI shows an interior for the filter and restrictor unit 17, with the pneumatic supply entering through pipe 66 leading into a filter assembly 68, passing through a connector passage 69 and into a restrictor unit 70, and out through the nozzle pipe 67. The nozzle pipe 67 is connected to the switch unit 15 through the body of the restrictor unit 70 and through a pipe 71. This connection, as shown in Figure VI, includes a direct connection between pipe 67 and pipe 71 through chamber 71' in the restrictor unit 70 and does not include the restrictor passage of the restrictor unit 70. The form and arrangement of the baffle plate 63 is such that the pneumatic flow from the nozzle 64 is increasingly restricted as the baffle 63 is moved toward the nozzle 64. This action results in nozzle back pressure increase in the nozzle pipe 67. As a matter of practice, a "zero" position of the baffle 63 is established with a predetermined spaced relation between the baffle and the nozzle, thus establishing a predetermined nozzle back pressure. This "zero" position of the baffle 63 is accomplished by adjusting the screw 45 into abutment with the baffle and further, to move the baffle against the bias of its spring 65 and away from the nozzle 64.

In a motion balance arrangement under the above conditions, therefore, if the bellows 11 is provided with a higher pressure than is the bellows 12, the flexure arm 21 will be moved (to the right in Figure I) so that the baffle spring 65 is allowed to move the baffle 63 toward the nozzle 64. Thus a "positive" differential is so indicated by the indicator unit 14 and results in an increased nozzle back pressure in the nozzle pipe 67.

The switch unit 15 includes a bellows 72 to which the nozzle back pressure is applied through the pipes 67 and 71. A flexure arm 73 is mounted for engagement and movement by the bellows 72, and an electrical snap switch 74 is mounted for engagement and actuation by the flexure arm 73. As the bellows 72 is expanded by the nozzle back pressure it pushes the flexure arm 73 against the actuating pin 75 of the switch 74. When the bellows (72) pressure is thereafter reduced, the conventional spring action of the switch pin 75 and the self bias of the flexure arm 73 returns the arm 73 to a normal "zero" position. The snap switch 74 is conventional in that it has a common electrical contact, an electrical contact for the depressed position of the pin 75, and an electrical contact for the "zero," undepressed position of the pin 75. Thus the snap switch is arranged to complete one electrical circuit when the switch pin 75 is depressed, and to complete another electrical circuit when the switch 75 is undepressed.

In an illustrative form and use of this invention, the depressed pin circuit is completed upon the occurrence of a very small positive pressure differential between the bellows 11 and 12. That is, the pressure in bellows 11 is slightly the greater. Further, the undepressed pin circuit is completed when the pressure differential between the bellows 11 and 12 is zero. This "zero" circuit may be used as an alarm device, suitably connected (not shown) to a buzzer, light, or other device, as desired.

An adjustment feature of the switch unit 15 is provided in the form of a bolt 76 which is mounted on a support 77 for adjustment therethrough into abutment with the switch flexure arm 73, in opposition to the expansion movement of the bellows 72 as desired. With this arrangement the flexure arm 73 is centrally depressed by expansion of the bellows 72 instead of being pivoted as is the case when the adjustment screw 76 is not used. The large amplification factor of this whole system may thus be tempered as desired, to prevent excess force application to the electrical switch 74.

The device of this invention is provided for the operation of an electrical switch from a small pneumatic pressure differential. An example of the requirements of such a switch is an actuating force of 9 ounces and an operating travel of .003 of an inch. To achieve this without amplification, a pair of differential bellows such as discussed herein may have to provide a differential force of 9 ounces, since for a particular bellows arrangement, calculations can show that 1 ounce differential will produce a movement of .001 of an inch. Even a one ounce switch would require a one ounce differential. This invention includes consideration of differential forces of fractions of an ounce.

Many factors enter into an exact calculation of the forces and movements of this device. It is believed sufficient for the purposes of this invention to point out that snap action electrical switches are limited in the sensitivity of their operation by the necessity of mechanical considerations. This invention provides a pneumatic amplification combination which makes it practical to operate such ordinary switches from very small pneumatic forces.

The differential pressure force of the device of this invention is mechanically amplified by the leverage arrangements of the flexure arm 21 and the baffle 63. Further, as represented in the curve shown as Figure II, .001 of an inch movement of the baffle 63 can result in 4 pounds change in the nozzle back pressure. Thus it is clear that a fraction of an ounce of differential pressure force can easily provide a 9 ounce force and .003 of an inch movement in the electrical switch bellows 72.

The figures given above are simply by way of illustration of the operation of the device of this invention. Clearly many combinations of forces and movements may be used. The point illustrated is that this invention provides a new and useful combination wherein a delicate balance between pneumatic forces can be obtained, even when such forces are relatively large, this being accomplished by the mechanical-pneumatic amplification of very small forces up to sufficient factors for the operation of conventional, readily available electrical switches.

This invention, therefore, provides a new and improved electro-pneumatic switching system.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

A differential pressure switching system wherein a small force as produced by the opposition of large pressures is substantially amplified comprising, in combination, a flexured arm, a pair of matched and balanced bellows mounted against said arm and in operative opposition to each other for producing a small unbalance force from the opposition of two relatively very large pneumatic pressures in said bellows, a pneumatic by-pass connection from one to the other of said pair of bellows for use in balancing said bellows against each other and a shut-off valve in said connection for closing said bypass during the operation of said switching system, means for adjustably varying the effective lever length of said flexured arm between the flexure point thereof and the point of effective force application of at least one of said bellows to said flexure arm, a pneumatic amplifier nozzle-baffle system for applying a large amplication factor to said small unbalance force, a first mechanical connection between said flexured arm and an operatively movable portion of said nozzle-baffle system, means for adjustably varying the length of said first mechanical connection, an indicator device for indicating the value of said small unbalance force, a second mechanical connection between said flexured arm and said indicator device, means for adjustably varying the length of said second mechanical connection, a mechanical linkage amplification system involving said flexured arm and said operatively movable portion of said nozzle-baffle system for adding to said pneumatic amplification of said small unbalance force, an output bellows arranged for pneumatic actuation by the output of said pneumatic amplifier system in a movement-force combination in representation of said small unbalance force, a second flexured arm arranged to be engaged and moved by said output bellows, means for adjusting said second flexured arm against said output bellows to adjustably vary the force of opposition of said second flexured arm to said output bellows, and a mechanically operable calibration test device mounted for engaging and moving said differential pressure bellows flexured arm in simulated representation of small forces as produced by differentials between pressures in said pair of bellows.

References Cited in the file of this patent

UNITED STATES PATENTS

| | | |
|---|---|---|
| Re. 23,536 | Del Mar | Aug. 26, 1952 |
| 1,381,139 | Smoot | June 14, 1921 |
| 1,987,200 | Mabey | Jan. 8, 1935 |
| 2,242,656 | Moore | May 20, 1941 |
| 2,521,477 | Pellettere | Sept. 5, 1950 |
| 2,626,626 | Rosenberger et al. | Jan. 27, 1953 |
| 2,658,392 | Vannah | Nov. 10, 1953 |